United States Patent
Greenwood

[15] 3,691,983
[45] Sept. 19, 1972

[54] IDENTIFICATION SYSTEM FOR WATER POLLUTION DETECTION

[72] Inventor: Edward L. Greenwood, 3721 S. Queensgrove Circle, Virginia Beach, Va. 23452

[22] Filed: Sept. 22, 1970

[21] Appl. No.: 74,255

[52] U.S. Cl..............................116/114 R, 40/326
[51] Int. Cl..............................................G01d 21/00
[58] Field of Search ....116/114, 117, 32; 73/407, 53, 73/194 E, 170, 422 GC, 425, 425.2, 425.4; 23/253 TP, 230; 206/0.5, 46; 40/326; 210/109, 18, 40; 222/57; 229/93; 128/260, 2, 271

[56] References Cited

UNITED STATES PATENTS

| | | | |
|---|---|---|---|
| 1,483,996 | 2/1924 | Tongue | 40/326 |
| 1,787,995 | 1/1931 | Reilly | 40/326 |
| 1,816,939 | 8/1931 | Stangler | 116/32 |
| 1,846,518 | 2/1932 | Hibline | 40/326 |
| 2,685,517 | 8/1954 | Dunmire | 116/114 UX |
| 2,994,404 | 8/1961 | Schifferly | 206/0.5 UX |
| 3,320,621 | 5/1967 | Vita | 210/18 |

*Primary Examiner*—Louis J. Capozi
*Attorney*—Finnegan, Henderson & Farabow

[57] ABSTRACT

In a method of identifying sources of water pollution, buoyant indicator elements which identify the source of polluting material are injected into the polluting material and discharged with the material into a body of water to enable the pollution to be traced to its source. In a preferred embodiment, the indicator elements comprise a plurality of buoyant pellets having indicia which identify the source of discharged material. The pellets can be provided with absorptive cores for absorbing a portion of the discharged material to enable the type of polluting material to be determined by examination of the discharged pellets.

14 Claims, 6 Drawing Figures

PATENTED SEP 19 1972 3,691,983

INVENTOR
EDWARD L. GREENWOOD

*Finnegan, Henderson & Farabow*
ATTORNEYS

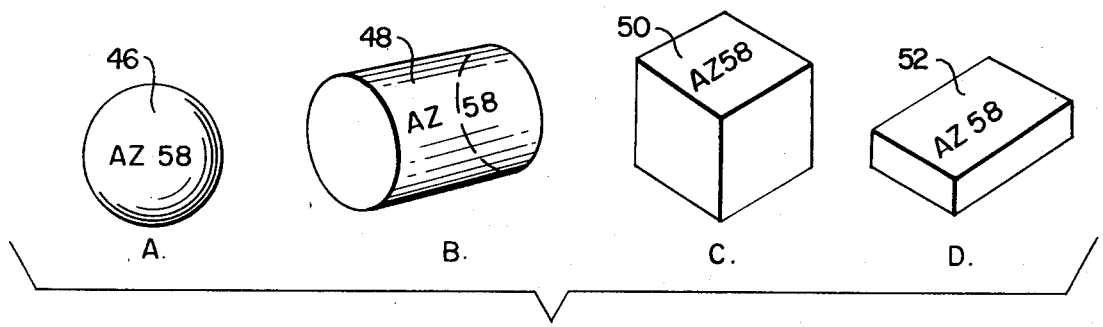
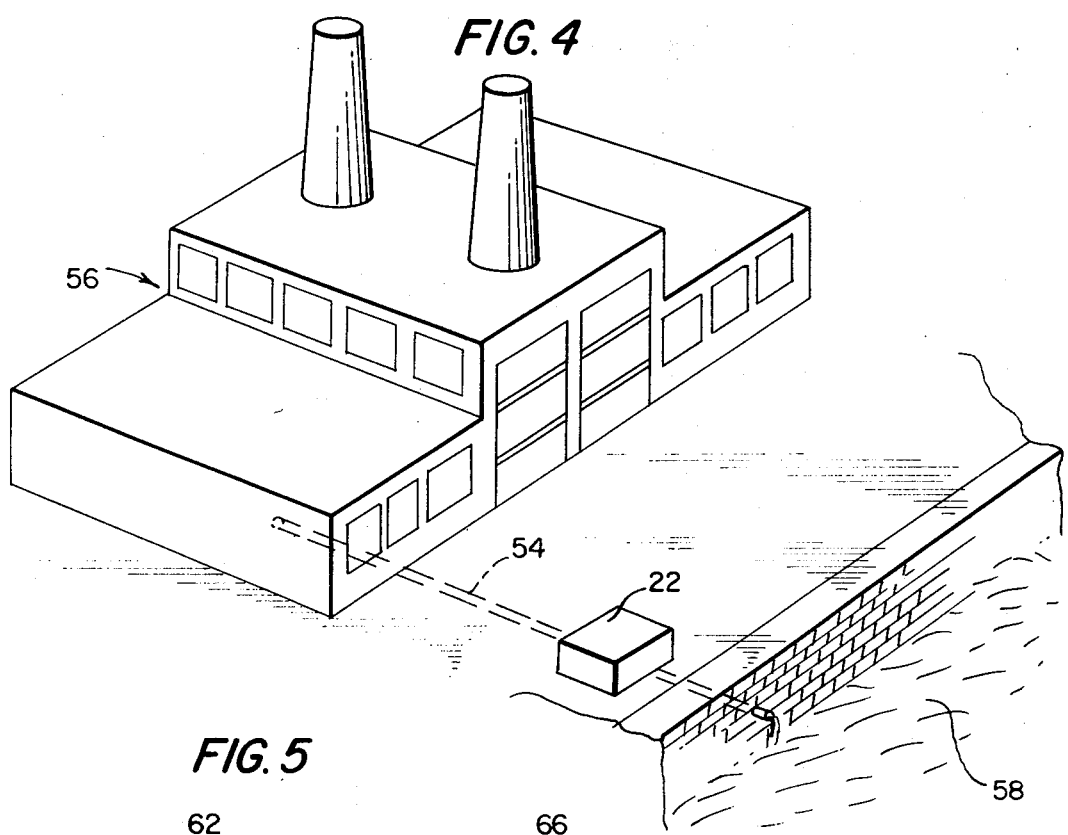
FIG. 4
FIG. 5
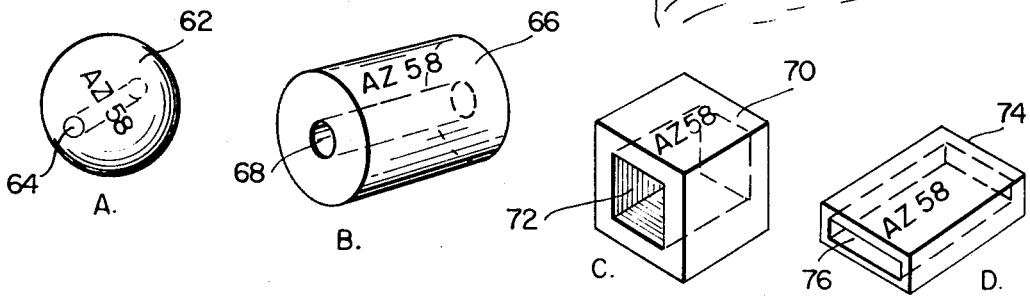
FIG. 6
INVENTOR
EDWARD L. GREENWOOD
Finnegan, Henderson & Farabow
ATTORNEYS

IDENTIFICATION SYSTEM FOR WATER POLLUTION DETECTION

The present invention relates to an identification system for detecting the sources of water pollution and, more particularly, to a method of identifying a source of polluting material discharged into a body of water.

The invention provides an identification system which enables polluting material discharged into a body of water to be traced to a particular source of pollution and serves as a deterrent to prevent the unauthorized discharge of polluting material into the water. The system is particularly useful in identifying any water vessel having a discharge line capable of discharging polluting material from its bilge and in identifying any industrial site having a discharge line through which industrial waste products are discharged into a body of water.

The preservation of the quality of our environment is a problem which has recently received an increased amount of attention by ecologists and other persons concerned with the apparent deterioration of our environment. The pollution of our land, water, and atmosphere is occurring at an ever-increasing rate because of the rapid expansion in the numbers of sources of polluting material. The seriousness of this problem is evident from observing the air pollution around our cities, the water pollution of our streams, lakes, rivers, and oceans, and the damage to our land resulting from the disposal of large amounts of waste products and material.

Previous efforts in controlling the pollution of our environment have included technological developments for treating, disposing, and reclaiming of waste products and materials. These developments have been primarily concerned with the problems of decreasing the polluting effects of waste materials on our environment and the removal of previously discharged polluting material from our environment.

In addition, governmental regulation has attempted to control the sources of polluting material. Our Federal, State, and local governments have enacted legislation limiting the discharge of waste material into streams, rivers, lakes, and oceans to preserve the quality of the natural water resources of our country. This legislation has not been sufficient to prevent continued pollution of our water resources because of the difficulty of identifying the sources of polluting material discharged into bodies of water.

For example, the discharge of oil from a water vessel into the navigable waters of the United States is presently prohibited by Federal statues. These statutes prohibit the discharge of bilge water into the navigable waters of the United States. On addition, Federal legislation enacted under the International Convention for the Prevention of Pollution of the Sea by Oil, 1954; prohibits the discharge of oil or oily mixtures into sea areas within fifty miles from the nearest land of the United States. Bilge water containing no oil other than lubricating oil which has drained or leaked from machinery spaces in the vessel is not covered by this legislation. Since it is relatively easy for a water vessel to discharge its bilge water and to remain unidentified, it is desirable to provide an identification system which insures that the vessel discharging its bilge can be identified.

In addition, Federal legislation provides for actions to secure the abatement of the pollution of interstate navigable waters from any source of polluting material. The problem of identifying the source of polluting material also occurs in enforcement of this legislation so that a system for positively identifying the source of water pollution is desirable.

The present invention is concerned with a problem of water pollution and provides a method of identifying the source of polluting material discharged into a body of water. In accordance with the method, buoyant indicator elements which identify the source of discharged material are discharged into the body of water at the same time that the polluting material is discharged. The indicator elements remain with the polluting material to positively identify the source from which the material is discharged.

For the system to be an effective deterrent to unauthorized discharge of polluting material, it is contemplated that the system be made compulsory so that indicator elements identifying the source of pollution are discharged along with polluting material.

In a preferred embodiment, the indicator elements comprise a plurality of buoyant pellets having indicia which identify the source of discharged material. When the pellets are discharged with the polluting material, the pellets remain on the surface of the body of water to identify the source of the discharged material. In another embodiment, the pellets are provided with absorptive cores for absorbing a portion of the discharged material to enable the type of polluting material to be determined by examination of the discharged pellets.

The method of this invention is particularly suited to identification of a water vessel that discharges contaminating fluids, such as bilge water, ballast water, or sewerage, through a discharge line into a body of water. Bilge water normally contains waste material, e.g., oil, which would pollute the water if discharged from the vessel. Ballast water of the vessel may also be contaminated to constitute a pollutant when discharged. Thus, it is desirable to provide for identification of a water vessel that discharges its bilge water, ballast water, or any other contaminating fluid into a body of water. In accordance with the present invention, this identification is accomplished by injecting a plurality of buoyant indicator elements which identify the vessel into the contaminating fluid as it passes through the discharge line and discharging the indicator elements and fluid into the body of water to provide a plurality of indicators on the surface of the body of water to identify the vessel.

The method of the present invention is also suitable for identifying an industrial site having a discharge line through which polluting material is discharged into a body of water. In accordance with the method of this invention, identification of the industrial site is accomplished by injecting a plurality of buoyant indicator elements which identify the industrial site into the polluting material as it passes through the discharge line and discharging the buoyant indicator element and the polluting material from the discharge line into the body of water. This method provides a plurality of indicators on the surface of the body of water to identify the industrial site as a source of polluting material.

The present invention also contemplates a unique pellet for use in a system for identifying the source of polluting material discharged into a body of water. In accordance with the invention, the pellet comprises a hollow housing having indicia to identify the source of polluting material discharged into the body of water, and a core of absorptive material located within the hollow housing for absorbing a portion of the discharged polluting material to enable the type of polluting material to be determined by examination of the pellet. In a preferred embodiment, the hollow housing is composed of buoyant material, e.g., wood or plastic.

The accompanying drawings illustrate a preferred system which employs the principles of the present invention and, together with the description, serve to explain the principles of the invention.

Of the drawings:

FIGS. 4A–4D illustrate indicator elements in the form of buoyant pellets which can be used in the identification system of the present invention;

FIG. 5 illustrates the system of the present invention in combination with the discharge line of an industrial site for inserting indicator elements in polluting material discharged from the industrial site into a body of water to identify the source of polluting material; and FIGS. 6A–6D illustrate indicator elements in the form of buoyant pellets having absorptive cores which can be used in the system of the present invention to absorb a portion of the discharged polluting material and to identify the source of the material.

The present invention contemplates a system for identifying sources of water pollution. The system is designed to simplify the task of administration of legislation for controlling water pollution and to enable the laws on water pollution to be enforced more effectively. The system provides a simple and efficient method for identifying the source of polluting material discharged into a body of water.

Figure 1:
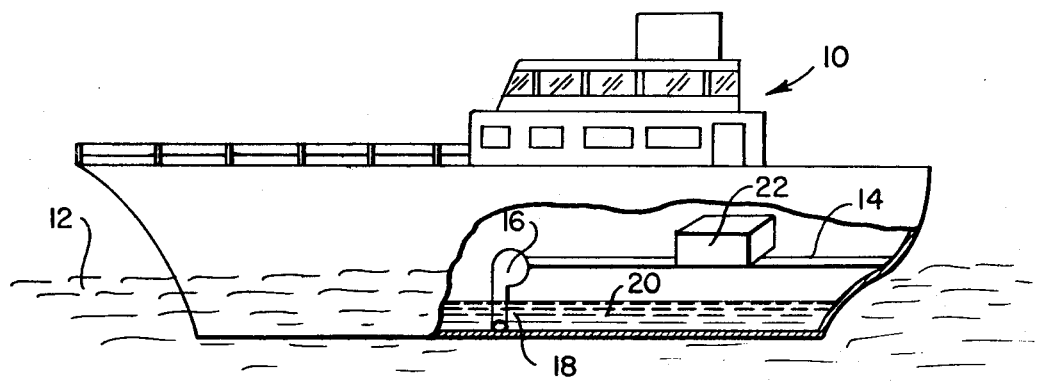
FIG. 1 is a partially cutaway view of a water vessel incorporating the identification system of the present invention in its discharge line for injecting buoyant indicator elements into bilge water, ballast water, or any other contaminating fluid as it passes through the discharge line to identify the vessel from which the fluid is discharged.

The system of the present invention can be used with all water vessels, regardless of class or inspection, including governmental vessels, deep sea fishing craft, small boats, and public and private vessels. Referring to FIG. 1, a water vessel 10 incorporating an identification system which operates in accordance with the principles of the present invention is shown afloat on the surface of a body of water 12. Water vessel 10 includes a discharge line 14 connected to a pump 16 having an input line 18 extending into the interior of the vessel. When pump 16 is operated, bilge water, ballast water, or other contaminating fluid 20 located in the interior of the vessel is pumped through input line 18 to discharge line 14 and is discharged from the e The water vessel may include a plurality of discharge lines and corresponding pumps for discharging fluids from the vessel.

Figure 2:
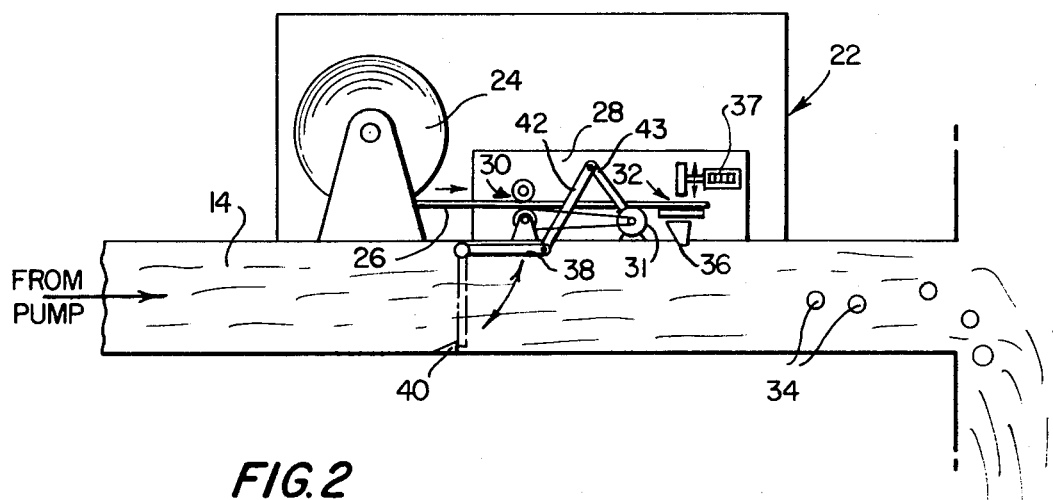
FIG. 2 illustrates the identification system and discharge line of the water vessel of FIG. 1 in detail.

The identification system comprises a device 22 for injecting buoyant indicator elements into the contaminating fluid as it passes through discharge line 14. In the case of a vessel with a plurality of discharge lines, a separate device 22 can be provided for each of the discharge lines. The present invention is not limited to any particular type of device for injecting indicator elements into the contaminating fluid, and any conventional device capable of supplying indicator elements, such as pellets carrying identifying indicia, to the discharge line can be used. As shown in FIG. 2, a preferred embodiment of device 22 of the identification system includes a supply spool 24 for supporting an elongated strip 26 of buoyant material, e.g., plastic. In the preferred embodiment, the elongated strip of buoyant material is fed to a pellet forming machine 28 (shown schematically in FIG. 2) which forms a plurality of buoyant pellets from the elongated strip.

Pellet forming machine 28 includes, for example, an advancing mechanism 30 comprising a pair of rollers for frictionally engaging elongated strip 26 and a motor 31 for driving at least one of the rollers. The pellet forming machine also includes, for example, a cutting and stamping device 32 for simultaneously cutting the elongated strip into pellets 34 and applying indicia to the pellets. The pellets serve as indicators for identifying the vessel from which polluting material is discharged. Cutting and stamping device 32 can be operated by the same motor which operates advancing mechanism 30. Pellet forming machine 28 also includes an outlet port 36 in communication with discharge line 14 through which the pellets are injected into the material flowing through the discharge line.

The pellet forming machine includes a mechanical counter 37 (FIG. 2) for counting the number of pellets 34 inserted into the discharge line. Counter 37 is operatively connected to cutting and stamping device 32 and is advanced by one unit every time that the cutting and stamping device produces a pellet. The counter enables the operation of device 22 to be monitored by observing the counter readings at the start and end of the operation of the device.

The operation of pellet forming machine 28 is controlled by the position of a flow gate 38 pivotally mounted in discharge line 14 of the water vessel. Flow gate 38 is spring-biased into a normally closed position against a stop 40 mounted on the inner wall of the discharge line. A link 42 connects flow gate 38 to a control arm 43 of regulating device (not shown) in pellet forming machine 28 for controlling the speed at which advancing mechanism 30 and cutting and stamping device 32 are operated.

In the operation of the system, the position of flow gate 38 determines the rate at which pellets are produced by pellet forming machine 28. The position of flow gate 38 is determined by the rate of flow of the contaminated fluid through discharge line 14.

When there is no flow through the discharge line, flow gate 38 is biased into its normally closed position against stop 40 and the pellet forming machine is turned off. If bilge water, ballast water, or any contaminating fluid starts to flow through discharge line 14, flow gate 38 is partially opened and the pellet forming machine is operated to inject pellets into the discharge line. As the rate of flow in discharge line 14 increases, flow gate 38 is moved toward its fully open position and the speed of operation of the pellet forming machine is increased to inject pellets into the discharge line at a faster rate. Thus, the number of pellets injected into the bilge water, ballast water, or contaminating fluid as it passes through discharge line 14 is determined by the rate of flow through the discharge line.

Figure 3:
FIG. 3 illustrates a mass of polluting material on the surface of a body of water and a plurality of buoyant indicator elements dispersed in the polluting material to identify the source from which the material is discharged.

As shown in FIG. 3, the material discharged from water vessel 10 floats on the surface of the body of water and comprises a mass of contaminating fluid 44 in which a plurality of buoyant pellets 34 is dispersed. The vessel from which the contaminating fluid is discharged can be identified by examining one or more of the buoyant pellets and observing the indicia on the pellets.

In an alternative embodiment of pellet forming the system, elongated strip 26 can be prepared with indicia previously applied to the strip at uniformly spaced locations. The stamping operation of machine 28 can be eliminated so that it is only necessary to advance strip 26 to a cutting device to form buoyant pellets having indicia to identify the vessel discharging polluting material. In this embodiment, counter 37 is operatively connected to the cutting device and counts the number of pellets produced by the cutting device.

In another embodiment of the system, the buoyant pellets are completely preformed with the required indicia printed or stamped on the pellets. In this embodiment, a mass of preformed pellets is stored in a container (not shown) located above the discharge line of the water vessel, and the container is provided with a gate through which the pellets can be injected into the discharge line. Flow gate 38 can be connected by control arm 42 to the gate of the container to control the opening and closing of the latter gate. The control arm of flow gate 38 can be arranged so that the gate of the container is closed when flow gate 38 is biased into its normally closed position against stop 40 and is gradually opened by movement of flow gate 38 away from its normally closed position. In this embodiment, counter 37 can be provided with an actuator extending into outlet port 36 which is operated by the pellets discharged from the container. In the operation of this embodiment, the pellets are fed by gravity through outlet port 36 into the fluid flowing through discharge line 14 at a rate determined by the flow rate in the discharge line. The counter registers the number of pellets injected into the fluid in the discharge line.

In the above embodiments, it is contemplated that the operator of a water vessel equipped with an identification system will be required to record the counter readings at the start and end of every operation of the discharge lines of the vessel. In addition, the operator will be required to determine the position of the vessel at the time of discharge and to keep a record of the counter readings and vessel positions. These requirements will serve as a deterrent to unauthorized discharge of polluting material since discrepancies in the record can be easily detected by noting the locations where discharged pellets are found. The counter readings provide a measure of the amount of polluting material discharged and the length of time that the discharge line was in operation.

FIGS. 4A–4D illustrate various shapes which can be used for the pellets of the identification system of the present invention. The pellets can be in the shape of a sphere 46 (FIG. 4A), a cylinder 48 (FIG. 4B), a cube 50 FIG. 4C), or a strip 52 (FIG. 4D). In each instance, the pellet is provided with indicia, e.g., "AZ 58," to identify the source of discharged material. The indicia used on the pellets are not limited to a combination of letters and numbers, and any combination of symbols capable of distinguishing different sources can be used. In addition, color coding can be used for the pellets.

The system of the present invention is applicable to the detection of sources of water pollution having discharge lines through which polluting material is discharged. For example, the identification system can be adapted to the discharge line of an industrial site or any other private or public discharge line capable of emitting polluting material into a body of water. The types of industrial sites include manufacturing, reclamation, and treatment plants. The identification system can also be used to detect sources of polluting material that discharge into public sewer lines.

FIG. 5 illustrates the identification system of the present invention in combination with a discharge line 54 extending from an industrial site 56 to a body of water 58. The identification system includes a device 22 (identical to the device illustrated in FIGS. 1 and 2) for injecting buoyant indicator elements into the polluting material as it passes through discharge line 54 to identify the industrial site.

In the operation of the system of FIG. 5, a plurality of buoyant indicator elements which identify the industrial site are injected into the polluting material discharged from the site through its discharge line and the buoyant indicator elements and polluting material are then discharged from the discharge line into the body of water to provide a plurality of indicators on the surface of the water to identify the industrial site as the source of polluting material. In a preferred embodiment of the system, the indicator elements comprise a plurality of buoyant pellets, as shown in FIG. 3, having indicia which identify the industrial site.

The buoyant pellets are formed by device 22 as polluting material passes through discharge line 54, and the pellets are injected into the polluting material at a rate determined by the rate of flow of the polluting material through the discharge line. Indicia are applied to the pellets prior to the injection of the pellets into the polluting material in discharge line 54 to identify the industrial site.

The present invention also contemplates a unique pellet for use in the system for identifying the source of polluting material discharged into a body of water. In accordance with the invention, the pellet comprises a hollow housing having indicia to identify the source of polluting material discharged into the body of water and a core of absorptive material located within the hollow housing for absorbing a portion of discharged polluting material to enable the type of polluting material to be determined by examining the core of the pellet. In a preferred embodiment, the hollow housing is composed of buoyant material, e.g., wood or plastic.

Referring to FIG. 6, a plurality of pellets of various shapes constructed in accordance with the present invention are shown. FIG. 6A illustrates a spherical pellet 62 having a cylindrical core 54 of absorptive material extending along a diameter of the spherical pellet. FIG. 6B illustrates a cylindrical pellet 66 having a cylindrical core 68 of absorptive material extending axially along the center of the cylindrical pellet. FIG. 6C illustrates a pellet 70 in the form of a cube having a rectangular core 72 of absorptive material extending between opposite sides of the cube. Finally, FIG. 6D illustrates an elongated rectangular pellet or strip 74 having a rectangular core 76 of absorptive material extending lengthwise through the pellet.

The absorptive material used in the cores of the pellets shown in FIGS. 6A–6D is any material capable of absorbing a fluid. For example, the material can be cotton, paper, plastic having a porous structure, or any absorbant fiber. When these pellets are used in the identification system of the present invention, the absorptive material of the cores of the pellets absorbs a portion of the polluting material discharged into the body of water so that the nature of the polluting material discharged into the water can be determined by an examination of the core of the pellet.

The present invention provides an identification system for uniquely identifying the source of polluting material discharged into a body of water. The system enables the source of pollution to be determined by merely examining indicators which are discharged at the same time that polluting material is discharged into the body of water. The system also enables polluting material to be traced to a specific source of pollution and, thus, serves as a deterrent to violation of pollution regulations by discharging polluting material into a body of water.

The invention in its broader aspects is not limited to the specific details shown and described, and modifications may be made in the details of the identification system without departing from the principles of the present invention.

What is claimed is:

1. A method identifying a source of polluting material discharged into a body of water, which comprises:
   injecting buoyant indicator elements which identify the source into the polluting material at the source; and
   discharging the polluting material and indicator elements into the body of water at the same time to enable the source of discharged material to be determined by examination of the indicator elements.

2. A method of identifying a source of polluting material discharged into a body of water, which comprises:
   discharging a plurality of buoyant pellets having indicia formed thereon which identify the source of discharged material into the body of water at the same time that the polluting material is discharged into the body of water.

3. The method of claim 2, wherein the pellets are provided with absorptive cores for absorbing a portion of the discharged material to enable the type of polluting material to be determined by examining the cores of the discharged pellets.

4. A method of identifying a water vessel that discharges contaminating fluid through a discharge line into a body of water, which comprises:
   injecting a plurality of buoyant indicator elements which identify the vessel into the contaminating fluid as it passes through the discharge line; and
   discharging the indicator elements and contaminating fluid into the body of water to provide a plurality of indicator elements on the surface of the body of water to identify the vessel that discharged the contaminating fluid.

5. The method of claim 4, wherein the buoyant indicator elements are injected into the contaminating fluid at a rate determined by the rate of flow of the fluid through the discharge line.

6. The method of claim 4, wherein the indicator elements comprise a plurality of buoyant pellets having indicia formed thereon which identify the vessel.

7. The method of claim 6, which includes the steps of:
   forming a plurality of buoyant pellets as the contaminating fluid passes through the discharge line; and
   applying indicia on the pellets to identify the vessel prior to injecting the pellets into the contaminating fluid in the discharge line.

8. The method of claim 6, wherein the pellets are provided with absorptive cores for absorbing a portion of the discharged fluid to enable the type of polluting material contained in the fluid to be determined by examining the cores of the discharged pellets.

9. A method of identifying a source of pollution having a discharge line through which polluting material is discharged, which comprises:
   injecting a plurality of buoyant indicator elements which identify the source into the polluting material as it passes through the discharge line; and
   discharging the buoyant indicator elements and polluting material from the discharge line to provide a plurality of indicators in the polluting material to identify the source.

10. A method identifying an industrial site having a discharge line through which polluting material is discharged into a body of water, which comprises:
    injecting a plurality of buoyant indicator elements which identify the industrial site into the polluting material as it passes through the discharge line; and
    discharging the buoyant indicator elements and the polluting material from the discharge line into the body of water to provide a plurality of indicators on the surface of the body of water to identify the industrial site as the source of polluting material.

11. The method of claim 10, wherein the buoyant indicator elements are injected into the polluting material at a rate determined by the rate of flow of the polluting material through the discharge line.

12. The method of claim 10, wherein the indicator elements comprise a plurality of buoyant pellets having indicia formed thereon which identify the industrial site.

13. The method of claim 12, which includes the steps of:
    forming a plurality of buoyant pellets as the polluting material passes through the discharge line; and applying indicia on the pellets to identify the industrial site prior to injecting the pellets into the polluting material in the discharge line.

14. The method of claim 12, wherein the pellets are provided with absorptive cores for absorbing a portion of the polluting material to enable the type of polluting material to be determined by examining the cores of discharged pellets.

* * * * *